United States Patent
Vasyltsov (10) Patent No.: US 7,903,811 B2
(45) Date of Patent: Mar. 8, 2011

(54) CRYPTOGRAPHIC SYSTEM AND METHOD FOR ENCRYPTING INPUT DATA

(75) Inventor: Ihor Vasyltsov, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1259 days.

(21) Appl. No.: 11/484,852

(22) Filed: Jul. 12, 2006

(65) Prior Publication Data

US 2008/0044010 A1 Feb. 21, 2008

(30) Foreign Application Priority Data

Jul. 12, 2005 (KR) .................. 10-2005-0062907

(51) Int. Cl.
*H04L 9/22* (2006.01)
(52) U.S. Cl. .................. 380/28; 380/277; 380/44
(58) Field of Classification Search .................. 380/28
See application file for complete search history.

(56) References Cited

U.S. PATENT DOCUMENTS

| | | | |
|---|---|---|---|
| 5,793,659 A | 8/1998 | Chen | |
| 6,141,421 A * | 10/2000 | Takaragi et al. | 380/30 |
| 6,337,909 B1 * | 1/2002 | Vanstone et al. | 380/28 |
| 6,587,563 B1 * | 7/2003 | Crandall | 380/263 |
| 6,778,666 B1 * | 8/2004 | Kuzmich et al. | 380/28 |
| 6,873,706 B1 * | 3/2005 | Miyazaki et al. | 380/30 |
| 7,046,801 B2 * | 5/2006 | Okeya | 380/28 |
| 7,110,538 B2 * | 9/2006 | Gallant et al. | 380/28 |
| 7,418,099 B2 * | 8/2008 | Vanstone et al. | 380/28 |
| 7,599,491 B2 * | 10/2009 | Lambert | 380/30 |
| 2002/0057796 A1 * | 5/2002 | Lambert et al. | 380/28 |
| 2003/0123654 A1 * | 7/2003 | Lambert | 380/28 |
| 2003/0123655 A1 * | 7/2003 | Lambert et al. | 380/28 |

FOREIGN PATENT DOCUMENTS

| | | |
|---|---|---|
| DE | 202 17 616 U1 | 2/2003 |
| EP | 0872795 | 10/1998 |
| GB | 2428358 B * | 4/2008 |
| JP | 2003-131568 | 5/2003 |

OTHER PUBLICATIONS http://www.securitytechnet.com/crypto/algorithm/implementation.html, 5 pages, printed: Jan. 28, 2010.*
David J. Kappos, "Subject Matter Eligibility of Computer Readable Media", Jan. 26, 2010, 1 pages.*
Chae Hoon Lim et al. "Fast Modular Reduction With Precomputation", published: Oct. 1997.
British Search Report dated Oct. 11, 2006.
Comba, P.G.: Exponentiation cryptosystems on the IBM PC. IBM System Journal,. Vo. 29, No. 4, 1990, Stein 526-538.
German Office Action, dated Nov. 18, 2010, issued in Application No. 10-2006 033 386.1-31.

* cited by examiner

*Primary Examiner* — Ponnoreay Pich
(74) *Attorney, Agent, or Firm* — Harness, Dickey & Pierce, P.L.C.

(57) ABSTRACT

A cryptographic system and method for encrypting input data, in which an example system includes a table calculator configured to calculate table values composed of one of scalar multiplication values by Elliptic Curve (EC) operation, or exponentiation values by modular exponentiation operation, based on input data and the number of a portion of bits of each of secret keys. The table calculator may output one of scalar multiplication values or exponentiation values corresponding to a window that includes given bits of each of the secret keys from among the calculated table values. A logic circuit may be configured to output encrypted data by accumulating the output scalar multiplication values or by performing involution on the output exponentiation values.

13 Claims, 9 Drawing Sheets

CRYPTOGRAPHIC SYSTEM AND METHOD FOR ENCRYPTING INPUT DATA

PRIORITY STATEMENT

This application claims the benefit under 35 U.S.C. §119 of Korean Patent Application No. 10-2005-0062907, filed on Jul. 12, 2005 in the Korean Intellectual Property Office, the disclosure of which is incorporated herein in its entirety by reference.

BACKGROUND OF THE INVENTION

1. Field of the Invention

Example embodiments of the present invention relate in general to a cryptographic system and method for encrypting input data.

2. Description of the Related Art

In an effort to solve some of the problems in modern confidential data communications systems, hardware cryptographic systems based on well-known crypto-algorithms have become popular in an effort to satisfy continually growing performance requirements. These crypto-algorithms include public key algorithms, for example, Rivest-Shamir-Adleman (RSA) and Elliptic Curve Cryptography (ECC), and symmetric key algorithms, for example, the Data Encryption Standard (DES) and the Advanced Encryption Standard (AES).

Public Key Infrastructure (PKI) satisfying a high security level is widely used in data processing systems. Moreover, highly secure signature protocols can be implemented with only a PKI-based cryptosystem. This is one reason why interest in PKI has been growing in recent times.

But the efficient implementation of PKI requires the usage of a hardware realization of one or more specialized co-processors, also known as a "crypto-engine." For several decades, and in addition to hardware-oriented crypto-systems, new crypto-analysis methods, for example, Side-Channel Analysis (SCA) have been developed. There are several different attack methodologies, including Timing Analysis, Power Analysis, Electro-Magnetic Analysis, and Different Faults Analysis (DFA). It is known that these types of attack techniques can successfully attack the crypto-systems and obtain secret keys in less time and with less effort.

Accordingly, the development of countermeasures for use against these cryptanalysis methods (such as SCA) is becoming an important task for the future. In the DPA attack, which is a type of SCA, power tracks during scalar multiplication operations are analyzed to obtain information on secret keys. DPA attacks are based on a hypothesis that power tracks are correlated to instructions that a cryptographic device is executing, as well as to values of operands in the cryptographic process. Thus, examination of the power tracks can reveal information about the instructions being executed and the contents of data registers. In the case that the cryptographic device is executing a secret-key cryptographic operation, it may then be possible to deduce the secret key.

In Simple Power Analysis (SPA) attacks, information about secret keys can be deduced directly by examining the power tracks from a single secret key operation. Implementations of elliptic curve (EC) point multiplication algorithms may be particularly vulnerable, because the usual formulas for adding and doubling points are quite different and therefore may have power tracks which can be distinguished. Any implementation where the execution path is determined by secret key bits has potential vulnerability.

DPA attacks exploit variations in power consumption that are correlated to the data values being manipulated. These variations are typically much smaller than those associated with different instruction sequences, and may be obfuscated by noise and measurement errors. Statistical methods are used on a collection of power tracks in order to reduce the noise and strengthen the differential analysis.

To counter the SPA attacks, there are number of different countermeasures. However, most of the SPA countermeasures are weak as against DPA attacks. A DPA attack is more complex relative to an SPA attack and requires analysis of a substantial number of power tracks, yet is still applicable to leaking secret information. The complexity of the DPA attack can be measured in terms of a requested number of power tracks and in terms of the calculations performed by hardware resources. Of the many DPA countermeasure techniques have been developed, one of more popular techniques is a secret key exponent blinding countermeasure.

The PKI has many different algorithms for realizing encryption: hashing, signature generation and verification features. One of the main operations for these features is a modular exponentiation operation for an RSA-like system and a scalar multiplication operation for an ECC system.

These operations have substantially complex computation processes. Thus, to speed up the operations, many different methods have been used, for example, "Binary LTR/RTL," "Beta-ry LTR/RTL," and "Window LTR/RTL." Herein, LTR means left-to-right processing, and RTL means right-to-left processing.

Figure 1:
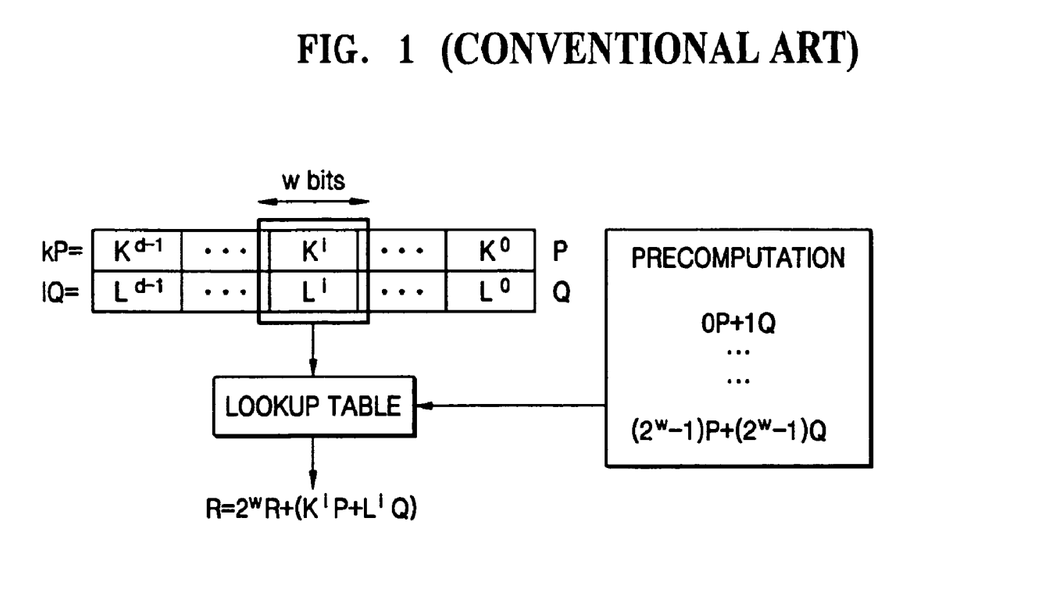
FIG. 1 is an illustration for explaining conventional multiple scalar multiplication.

FIG. 1 is an illustration for explaining conventional multiple scalar multiplication. Referring to FIG. 1, resultant data $R=kP+lQ$ for secret keys k and l is obtained by accumulating d times using a formula $R=2^W R+(K^i P+L^i Q)$ by referring to a relevant lookup table value for a 2×w window while shifting the secret keys k and l every w bits in the right direction. Herein, each of P and Q can be input data or a set of input data and basic data. This method is known as Shamir's trick and can be used for a secret-key exponent blinding countermeasure. In each multiplication step, w doubling operations and a single adding operation are performed. However, for such a lookup table, the number of data to be referred to is $2^{2w}-1$, e.g., $0P+1Q, 1P+0Q, 0P+2Q, \ldots, (2^w-1)P+(2^w-1)Q$, thereby requiring substantial memory capacity to store all the data.

In a practical secret-key exponent blinding countermeasure, a resultant point $Q=kP$ is obtained by splitting the secret key k into two parts, e.g., $k=k_1+k_2$, performing two scalar multiplication operations $Q_1=k_1P$ and $Q_2=k_2P$, and then performing a final adding operation $Q=Q_1+Q_2$.

Figure 2A:
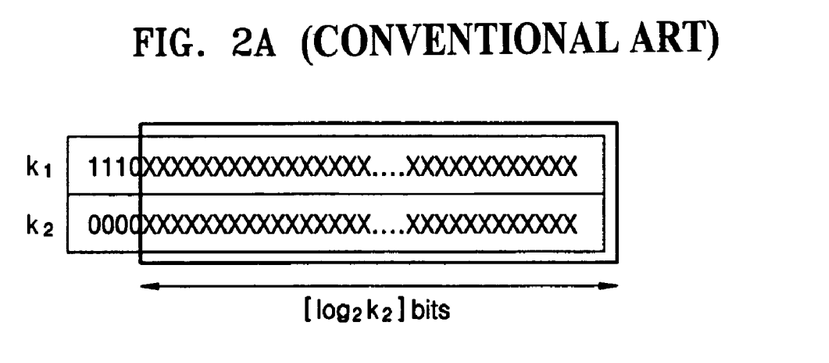
FIGS. 2A and 2B are illustrations for explaining conventional system performance when ECC is performed by splitting a secret key into two parts.
Figure 2B:
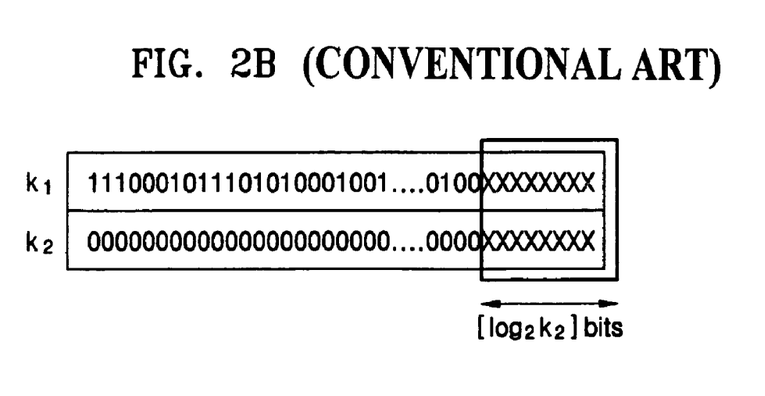

FIGS. 2A and 2B are illustrations for explaining conventional system performance when ECC is performed by splitting a secret key into two pairs. In a typical binary algorithm in which $Q=kP$ is directly implemented, the number of operations $O(n)$, for the scalar multiplication operation is given as $O(n)=n \cdot DBL+(0.2 \ldots 0.5)n \cdot ADD$, wherein DBL denotes an EC doubling operation, ADD denotes an EC adding operation, and $n=\log_2 k$ (the number of bits of a binary representation secret key). However, as compared to the typical binary algorithm, the method of splitting the secret key into two parts requires almost double the number of operations since $O(n) \cong 2([\log_2 k_2] \cdot DBL+(0.2 \ldots 0.5)[\log_2 k_2] \cdot ADD)+ADD$ when the number of bits of $k_2$ is almost the same as the number of bits of k as illustrated in FIG. 2A. When the number of bits of $k_2$ is substantially less than the number of bits of k as illustrated in FIG. 2B, then $O(n) \cong [\log_2 k_1] \cdot DBL+(0.2 \ldots 0.5)[\log_2 k_1] \cdot ADD+[\log_2 k_2] \cdot DBL+(0.2 \ldots 0.5)[\log_2 k_2] \cdot ADD+ADD$. Performance deterioration is acceptable in this case, but security is poor due to a change of only a portion of lower bits of k. In this case, the method of splitting the secret key into two parts has such complexity that an attacker can realize the changed lower bits of k by performing an exhausted computation for upper bits $[\log_2 k]-[\log_2 k_2]$ and the remaining lower bits related to $k_2$ among the secret key.

SUMMARY OF THE INVENTION

An example embodiment of the present invention is directed to a cryptographic system. A system in accordance with an example embodiment may include a table calculator configured to calculate table values composed of one of scalar multiplication values by Elliptic Curve (EC) operation, or exponentiation values by modular exponentiation operation, based on input data and the number of a portion of bits of each of secret keys, and to output one of scalar multiplication values or exponentiation values corresponding to a window made up of given bits of each of the secret keys among the calculated table values. A system in accordance with an example embodiment may include a logic circuit configured to output encrypted data by accumulating the output scalar multiplication values or by performing involution on the output exponentiation values.

Another example embodiment of the present invention is directed to a cryptographic system. A system in accordance with an example embodiment may include a splitter configured to receive an input secret key and to generate at least two split secret keys whose sum is the input secret key. A system in accordance with an example embodiment may include a selector configured to sequentially select a window made up of given bits of each of the split secret keys, and a table calculator configured to calculate table values composed of scalar multiplication values by Elliptic Curve (EC) operation based on an input point and the number of given bits, and to output scalar multiplication values corresponding to the selected window among the calculated table values. A system in accordance with an example embodiment may include an accumulator configured to accumulate the output scalar multiplication values and to output the accumulated value as an encrypted point.

Another example embodiment of the present invention is directed to a cryptographic system. A system in accordance with an example embodiment may include a splitter configured to receive an input secret key and to generate at least two split secret keys whose sum is the input secret key. A system in accordance with an example embodiment may include a selector configured to sequentially select a window made up of given bits of each of the split secret keys, and a table calculator configured to calculate table values composed of exponentiation values by modular exponentiation operation based on an input message and the number of given bits, and to output exponentiation values corresponding to the selected window among the calculated table values. A system in accordance with an example embodiment may include an involution unit configured to involve the output exponentiation values and to output the involved value as an encrypted message.

Another example embodiment of the present invention is directed to a method of encrypting input data. In a method in accordance with an example embodiment, an input secret key is received and at least two split secret keys are generated whose sum is the input secret key. A window composed of given bits of each of the split secret keys is sequentially selected, and table values composed of scalar multiplication values may be calculated by Elliptic Curve (EC) operation based on an input point and the number of given bits. Scalar multiplication values corresponding to the selected window from among the calculated table values may be output, and the output scalar multiplication values may be sequentially accumulated, with the accumulated value output as an encrypted point.

Another example embodiment of the present invention is directed to a method of encrypting input data. In a method in accordance with an example embodiment, an input secret key is received and at least two split secret keys are generated whose sum is the input secret key. A window composed of given bits of each of the split secret keys may be sequentially selected, and table values composed of exponentiation values may be calculated by modular exponentiation operation based on an input message and the number of given bits. Exponentiation values corresponding to the selected window from among the calculated table values may be output; and the output exponentiation values may be sequentially involved, with the involved value output as an encrypted message.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of example embodiments the present invention.

DETAILED DESCRIPTION OF THE EXAMPLE EMBODIMENTS

Example embodiments of the present invention provide a cryptographic system for blinding a secret key exponent while satisfying a given security level and performance, regardless of any field or any representation in a Rivest-Shamir-Adleman (RSA)-like crypto-system or an Elliptic Curve Cryptography (ECC) system. Example embodiments are also directed to a cryptographic method of blinding secret key exponent for a Differential Power Analysis (DPA) countermeasure in crypto-algorithms, for example, Elliptic Curve Cryptography (ECC) and Rivest-Shamir-Adleman (RSA).

An elliptic curve (EC) E is a set of points (x,y) which satisfy the EC equation (Equation 1) in the Weierstrass form where $a_n$ (n=1, 2, 3, etc.) is a non-zero constant:

$$E: y^2 + a_1 xy + a_3 y = x^3 + a_2 x^2 + a_4 x + a_6. \quad (1)$$

For cryptographic applications, the EC can be used over a prime finite field GF(p) or a binary finite field GF($2^n$). In an example embodiment, GF( ) denotes a Galois field, the prime finite field is a field containing a prime number of elements, and the binary finite field is a field containing $2^n$ elements.

If $n \geq 1$, then there is a unique field GF($2^n$) with $2^n$ elements. For the binary finite field case, Equation 1 may be changed to:

$$\begin{cases} GF(2^n) \\ y^2 + xy = x^3 + ax^2 + b; \\ b \neq 0 \end{cases} \quad (2)$$

The ECs include a point addition operation, and in a partial case include a point doubling operation. For example, to get the resultant point R=P+Q=($x_3$, $y_3$) from two points P=($x_1$, $y_1$) and Q=($x_2$, $y_2$), the next finite field operation (Equation 3) in the binary finite field GF($2^n$) may be preferred:

$$P \neq Q \Rightarrow \begin{cases} \theta = \dfrac{y_2 + y_1}{x_2 + x_1}; \\ x_3 = \theta^2 + \theta + x_1 + x_2 + a; \\ y_3 = \theta(x_1 + x_3) + x_3 + y_1; \end{cases} \quad (3)$$

When the point doubling operation (P=Q) is requested, then the next finite field operation (Equation 4) should be performed in the binary finite field GF($2^n$):

$$P = Q \Rightarrow \begin{cases} \theta = x + \dfrac{y}{x}; \\ x_3 = \theta^2 + \theta + a; \\ y_3 = \theta(x + x_3) + x_3 + y; \end{cases} \quad (4)$$

There are different possible representations of the point on the EC besides the Affine representation (used in the above equations), including the use of Ordinary Projective, Jacobian Projective, Lopez-Dahab Projective representations, etc., for example. Each of the representations may have its own advantages: improved performance, resistance to some kind of attacks or an easier-to-build system.

In an ECC-based system, an encrypted point Q can be generated by a scalar multiplication operation as in Equation 5, wherein P denotes an input point and k denotes a secret key.

$$Q = k \cdot P, \quad (5)$$

In the scalar point multiplication, the main operation computes Q=k·P=P+P+ . . . +P (k times). The scalar point multiplication is based on the point operations, which in turn are based on the finite field operations: multiplication in finite field, addition in finite field and squaring in the finite field. A related operation is the discrete logarithm, which consists in computing k from P and Q=k·P.

In an RSA-like system, an encrypted message C can be generated by a modular exponentiation operation as in Equation 6, wherein M denotes an input message, N denotes the module of a system in accordance with an example embodiment, and d denotes a secret key.

$$C = M^d \bmod N \quad (6)$$

Example embodiments of the present invention may be configured to encrypt input data by splitting a secret key into two parts and blinding the split secret keys with an acceptable memory size, without degradation in security and deterioration of performance. In the conventional art, to obtain the encrypted data R by the multiple scalar multiplication illustrated in FIG. 1, $2^{2w}-1$ scalar multiplication values as data to be referred to from the lookup table should be stored in a substantial sized memory. However, in accordance with example embodiments of the present invention, the cryptographic system can be operated without deterioration of performance by storing $2^{(w+1)}-2$ (see FIGS. 3 and 7) or $2^w-1$ (see FIGS. 5 and 9) scalar multiplication values or exponentiation values in a comparatively smaller memory.

Figure 3:
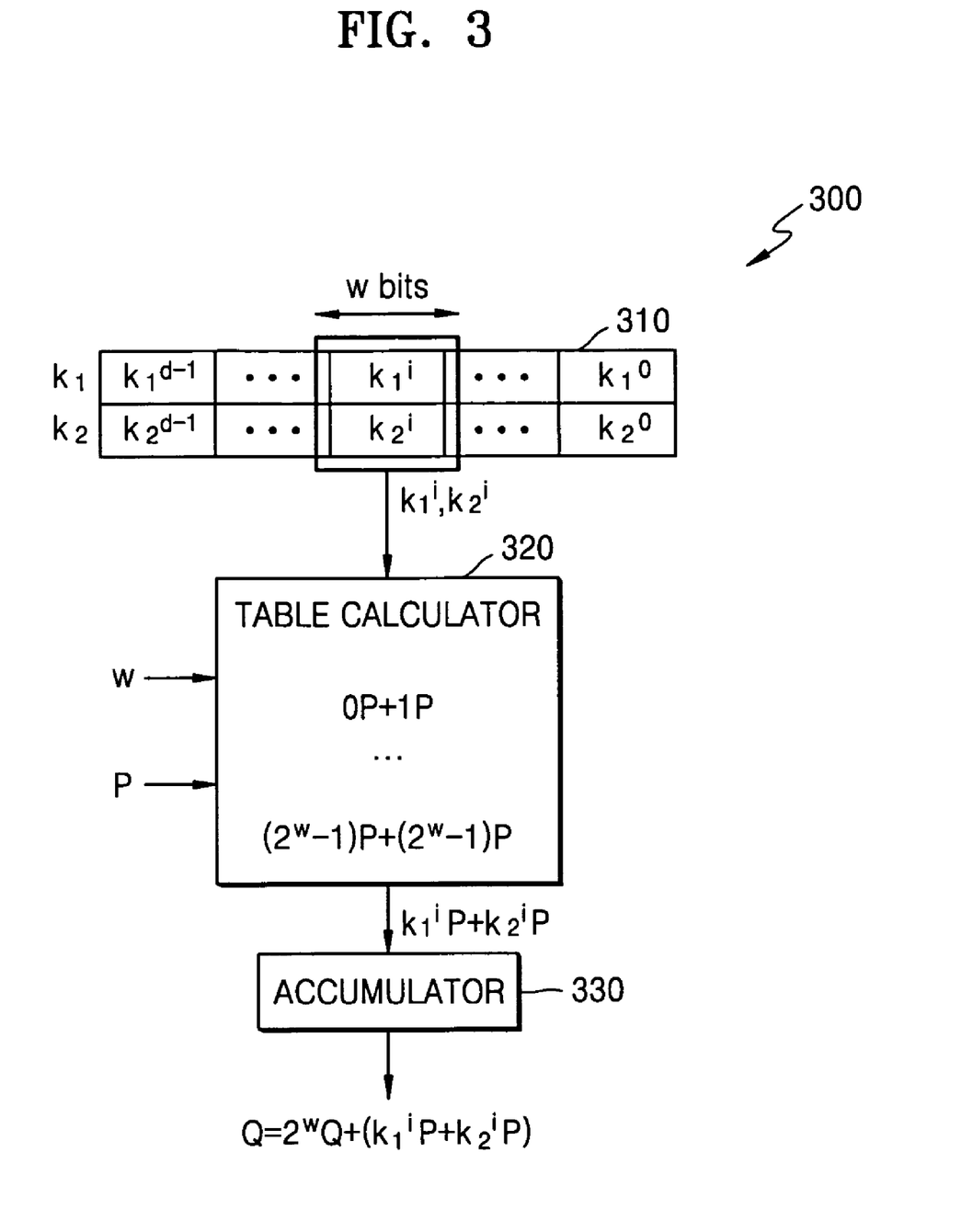
FIG. 3 is a block diagram of a performance-oriented cryptography apparatus for a blinding-exponent DPA countermeasure in ECC, according to an example embodiment of the present invention.

FIG. 3 is a block diagram of a performance-oriented cryptography system 300 for a blinding-exponent DPA countermeasure in ECC, according to an example embodiment of the present invention. Referring to FIG. 3, system 300 may include a splitter (not shown), a selector 310, a table calculator 320 and an accumulator 330. Operation of the cryptography system 300 of FIG. 3 may be described with reference to FIG. 4.

Figure 4:
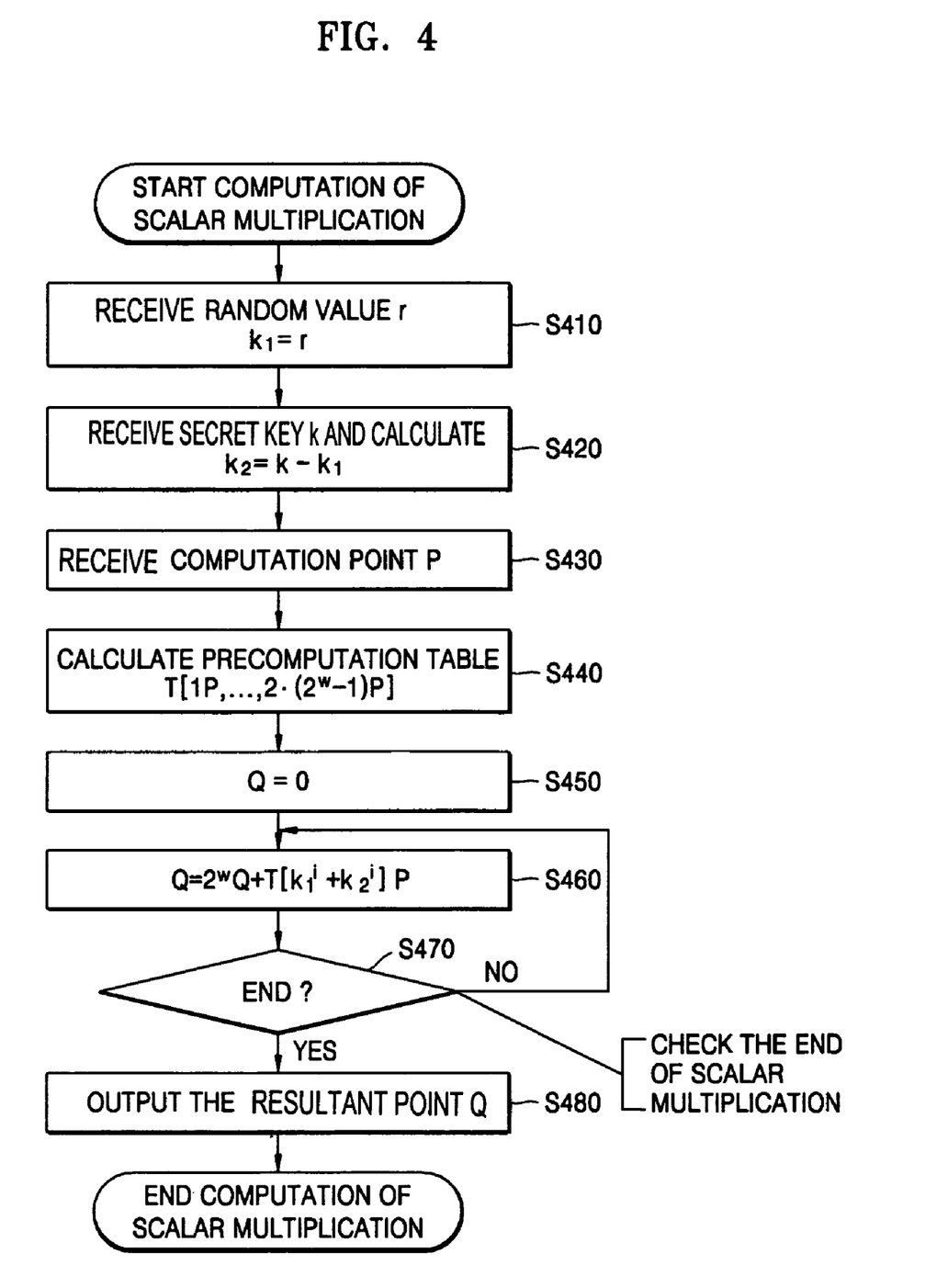
FIG. 4 is a flowchart illustrating an operation of the cryptography system of FIG. 3.

Referring to FIG. 4, the splitter receives (S410) a random value $k_1 = r$. The splitter receives an input secret key k and calculates another secret key $k_2 = k - k_1$ (S420). That is, to obtain encrypted data Q based on the multiple scalar multiplication, the splitter outputs two split secret keys $k_1$ and $k_2$. Although the number of split secret keys illustrated is two, the input secret key k can be split into more than two parts to increase the security level. In addition, the split secret keys may have the same number of bits, and a sum of the split secret keys may be the same as the input secret key k.

The table calculator 320 receives an input point P to be encrypted (S430) and receives the number w (an exponent value) of given bits (which may be calculated or known in advance) of each of the split secret keys $k_1$ and $k_2$. The table calculator 320 calculates (S440) table values T[1P, 2P, 3P, . . . , 2($2^w-1$)P] made up of $2^{(w+1)}-2$ scalar multiplication values by the EC operation based on the input point P and the number of bits w. That is, the table calculator 320 calculates, as the table values, scalar multiplication values of numbers (1, 2, 3, . . . , $2^{(w+1)}-2$), based on the input point P, where a number less than a number obtained by adding 1 to the number w of the given bits of each of the split secret keys $k_1$ and $k_2$ is an exponent (e.g., a number <w+1).

The accumulator 330 periodically resets (S450) a previous accumulation value before starting accumulation. Then, the selector 310 starts to sequentially select a window (2×w) made up of the given bits of each of the split secret keys $k_1$ and $k_2$. The selector 310 selects key values, $k_1^i$ of $k_1$ and $k_2^i$ of $k_2$, of the window $$(2 \times w) \left\lceil \dfrac{\log_2 \lceil k \rceil}{w} \right\rceil$$

times in an order from the upper part of the window to the lower part of the window in the LTR manner. The table calculator 320 outputs scalar multiplication values $(k_1^i + k_2^i)P$ corresponding to a sum $(k_1^i + k_2^i)$ of the key values of the selected window (2×w) from the calculated table values.

Then, the accumulator 330 accumulates the output scalar multiplication values $(k_1^i + k_2^i)P$ and outputs the accumulated value Q as an encrypted point. The accumulator 330 performs EC doubling operations $2^w Q$ (S460) of a previous accumulation value as many times as the number w of the given bits of each of the split secret keys $k_1$ and $k_2$ during each accumulation operation being performed, and performs an EC addition operation once by adding one scalar multiplication value (e.g., $(k_1^{d-1}+k_2^{d-1})P$, $(k_1^{d-2}+k_2^{d-2})P$, or $(k_1^{d-3}+k_2^{d-3})P, \ldots$) output according to a window selected by the accumulator 330 to the result of the EC doubling operations $2^w Q$. At S470, when the selector 310 selects a window $$\left\lceil \frac{\log_2 \lceil k \rceil}{w} \right\rceil$$

times, the accumulator 330 accumulates the output scalar multiplication values $(k_1^i + k_2^i)P$ $$\left\lceil \frac{\log_2 \lceil k \rceil}{w} \right\rceil$$

times (output of S470 is 'NO') in the same manner and finishes the accumulation (when output of S470 is 'YES').

If the secret key exponent blinding process is finished (output of S470 is 'YES'), the resultant output point Q is output (S480) to a post-processor in an upper layer. In the post-processor, a signature/verification routine according to the resultant output point Q may be performed. In an example, the accumulator 330 may also be referred to as a logic circuit configured to output the encrypted data (resultant output point Q).

Figure 5:
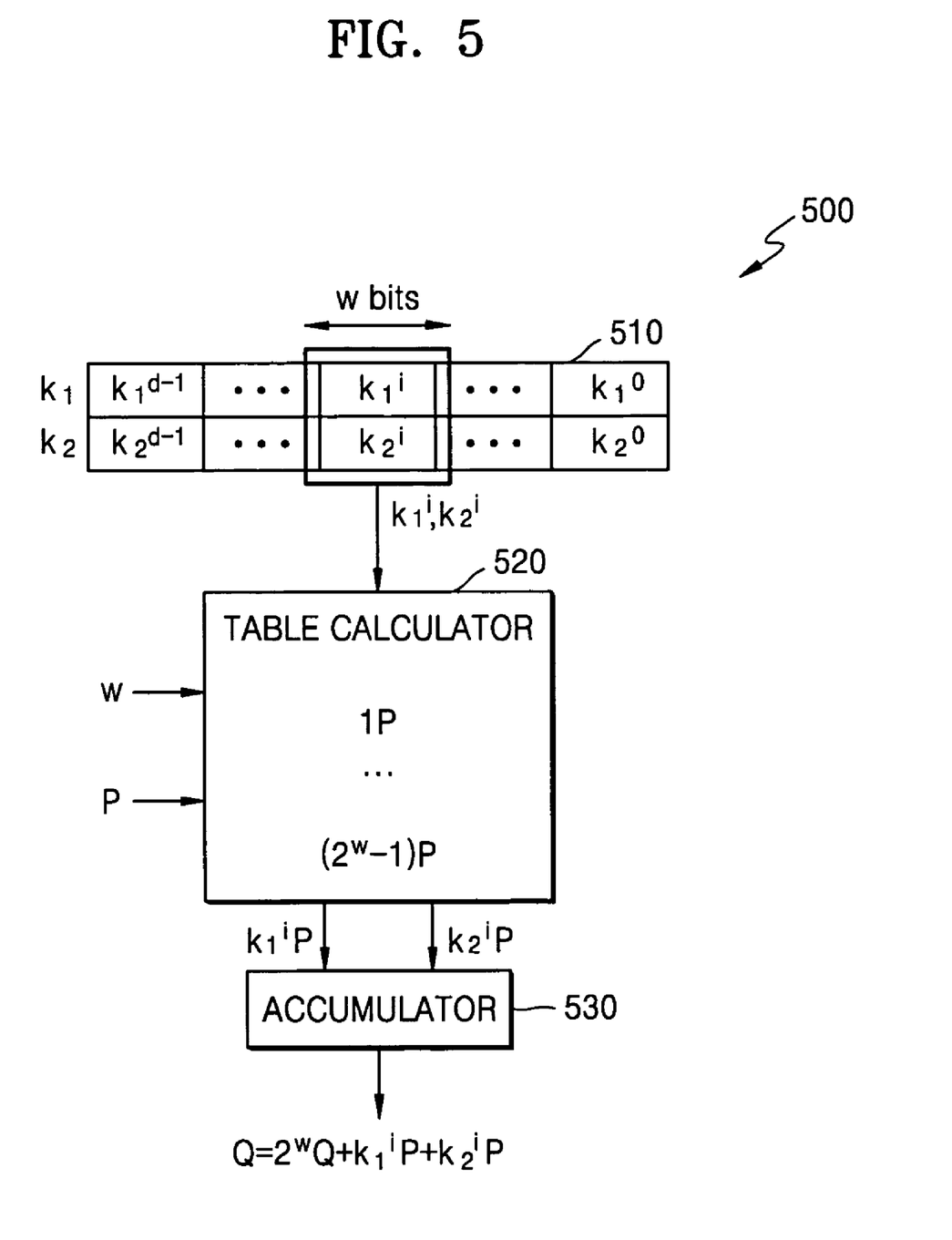
FIG. 5 is a block diagram of a memory-oriented cryptography system for a blinding-exponent DPA countermeasure in ECC according to another example embodiment of the present invention.

FIG. 5 is a block diagram of a memory-oriented cryptography system 500 for a blinding-exponent DPA countermeasure in ECC according to another embodiment of the present invention. Referring to FIG. 5, system 500 may include a selector 510, a table calculator 520 and an accumulator 530. Operation of the system 500 of FIG. 5 may be described with reference to FIG. 6.

Figure 6:
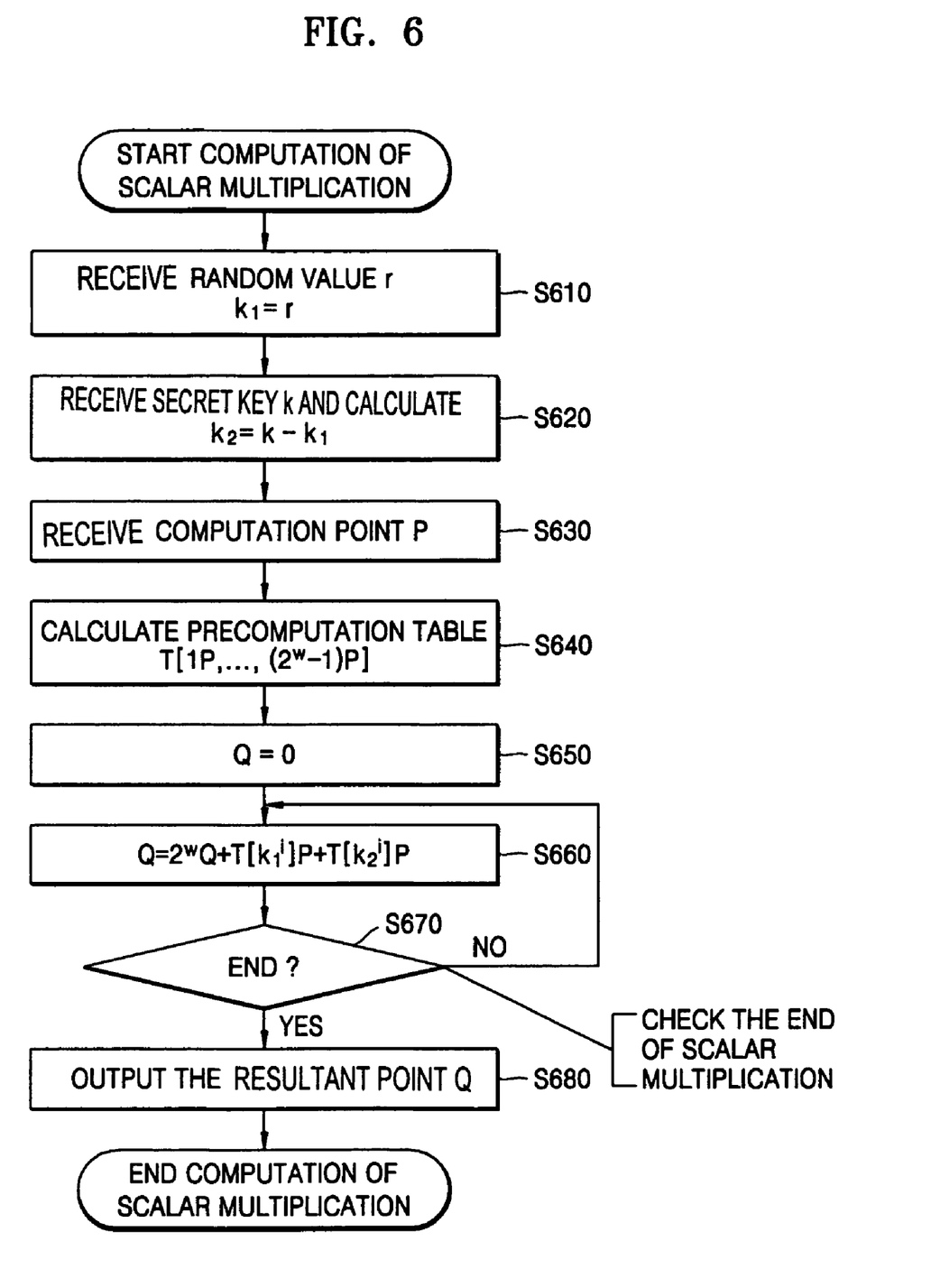
FIG. 6 is a flowchart illustrating an operation of the cryptography system of FIG. 5.

As in FIG. 4, a splitter (not shown) receives a random value $k_1 = r$ (S610) and an input secret key k (S620), calculates another secret key $k_2 = k - k_1$, and then outputs two split secret keys $k_1$ and $k_2$.

The table calculator 520 receives an input point P to be encrypted and receives the number w of given bits of each of the split secret keys $k_1$ and $k_2$ (S630). The table calculator 520 calculates table values $T[1P, 2P, 3P, \ldots, (2^w-1)P]$ made up of $2^w-1$ scalar multiplication values (S640) by the EC operation based on the input point P and the number of bits w. That is, the table calculator 520 calculates, as the table values, scalar multiplication values of numbers $(1, 2, 3, \ldots, 2^w-1)$ based on the input point, where a number less than the number w of given bits of each of the split secret keys $k_1$ and $k_2$ is an exponent.

The accumulator 530 periodically resets a previous accumulation value (S650) before starting accumulation. Then, the selector 510 starts to sequentially select a window $(2 \times w)$ made up of the given bits of each of the split secret keys $k_1$ and $k_2$. The selector 510 selects key values, $k_1^i$ of $k_1$ and $k_2^i$ of $k_2$, of the window $$(2 \times w) \left\lceil \frac{\log_2 \lceil k \rceil}{w} \right\rceil$$

times in an order from the upper part of the window to the lower part of the window in the LTR way. The table calculator 520 outputs scalar multiplication values $k_1^i P$ and $k_2^i P$ corresponding to each of the key values $k_1^i$ and $k_2^i$ of the selected window $(2 \times w)$ from the calculated table values. In an example embodiment, the sum $(k_1^i + k_2^i)P$ of the scalar multiplication values is not output, but two separate scalar multiplication values $k_1^i P$ and $k_2^i P$ are separately output. This is to reduce the size of the memory storing the table values $T[1P, 2P, 3P, \ldots, (2^w-1)P]$.

Then, the accumulator 530 accumulates the output scalar multiplication values $k_1^i P$ and $k_2^i P$ and outputs the accumulated value Q as an encrypted point. The accumulator 530 performs EC doubling operations $2^w Q$ of a previous accumulation value (at S660) as many times as the number w of the given bits of each of the split secret keys $k_1$ and $k_2$ during each accumulation operation, and performs an EC addition operation as many times as the number of the scalar multiplication values (e.g., twice) by adding two scalar multiplication values (e.g., $k_1^{d-1}P$ and $k_2^{d-1}P$, or $k_1^{d-2}P$ and $k_2^{d-2}P, \ldots$) output according to a window selected by the accumulator 530 to the result of the EC doubling operations $2^w Q$. In an example embodiment, since the size of the memory storing the table values $T[1P, 2P, 3P, \ldots, (2^w-1)P]$ in the table calculator 520 is reduced, performance may be degraded, since the addition operation is performed an additional time as compared to FIG. 3. However, since the numbers of bits of the split secret keys $k_1$ and $k_2$ are the same and the same input point P is used to generate the table values $T[1P, 2P, 3P, \ldots, (2^w-1)P]$, substantial performance deterioration may be avoided, and/or memory costs may be reduced as compared to the conventional arrangement in FIG. 1.

At S670, when the selector 510 selects a window $$\left\lceil \frac{\log_2 \lceil k \rceil}{w} \right\rceil$$

times, the accumulator 530 accumulates the output scalar multiplication values $k_1^i P$ and $k_2^i P$ $$\left\lceil \frac{\log_2 \lceil k \rceil}{w} \right\rceil$$

times (while output of S670) is 'NO') in the same manner and finishes the accumulation (while output of S670 is 'YES'). The resultant output point Q is output (S680) to a post-processor in an upper layer for signature/verification, for example. In an example, the accumulator 530 may also be referred to as a logic circuit configured to output the encrypted data (resultant output point Q).

Figure 7:
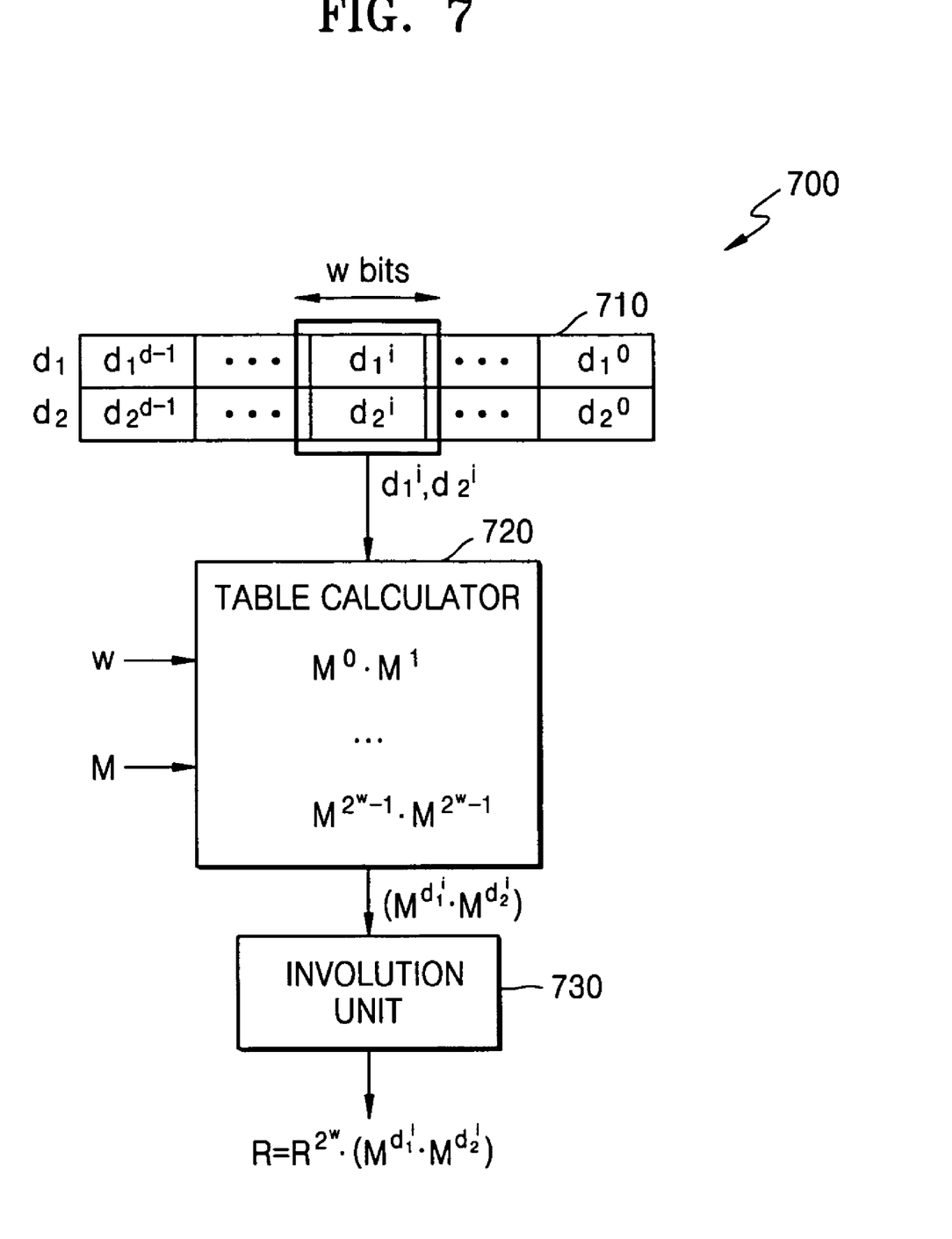
FIG. 7 is a block diagram of a performance-oriented cryptography system for a blinding-exponent DPA countermeasure in RSA-like cryptography according to another example embodiment of the present invention.

FIG. 7 is a block diagram of a performance-oriented cryptography system 700 for a blinding-exponent DPA countermeasure in RSA-like cryptography according to another example embodiment of the present invention. Referring to FIG. 7, the system 700 may include a selector 710, a table calculator 720 and an involution unit 730. Operation of the system 700 may be described with reference to FIG. 8.

Figure 8:
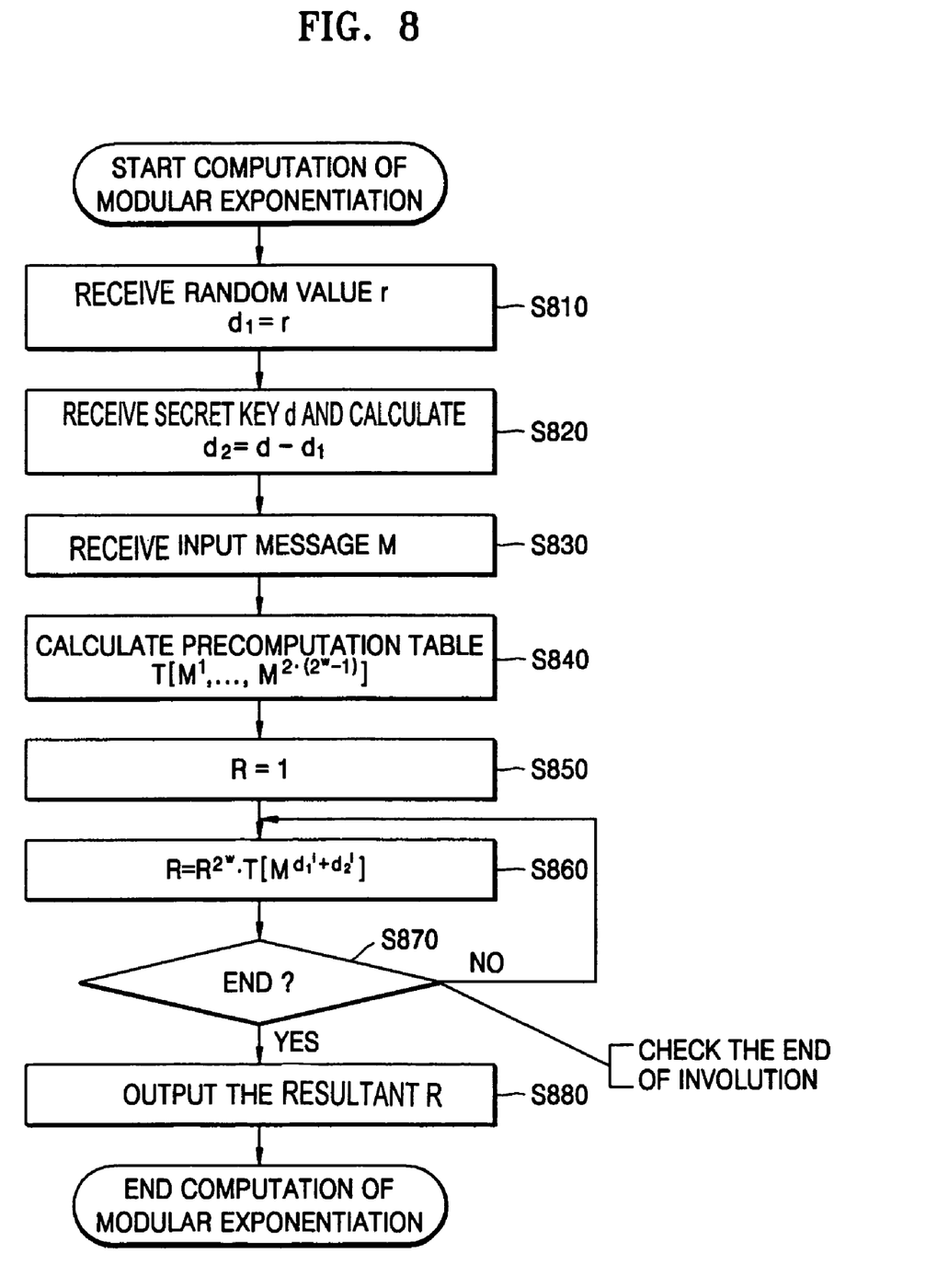
FIG. 8 is a flowchart illustrating an operation of the cryptography system of FIG. 7.

As in FIGS. 4 and 6, a splitter (not shown) receives a random value $d = r$ (S810) and an input secret key d, calculates another secret key $d_2 = d - d_1$ (S820), and then outputs two split secret keys $d_1$ and $d_2$.

The table calculator 720 receives an input message M to be encrypted (S830) and receives the number w of given bits of each of the split secret keys $d_1$ and $d_2$. The table calculator 720 calculates table values T[$M^1$, $M^2$, $M^3$, ... ] made up of $2^{(w+1)}-2$ exponentiation values (S840) by the modular exponentiation operation based on the input message M and the number of bits w. That is, the table calculator 720 calculates, as the table values, exponentiation values of the input message M where a number less than a number obtained by adding 1 to the number w of the given bits of each of the split secret keys $d_1$ and $d_2$ is an exponent (e.g., $2^{(w+1)}-2$).

The involution unit 730 periodically resets (R=1) a previous involution value (S850) before starting involution. Then, the selector 710 starts to sequentially select a window (2×w) made up of the given bits of each of the split secret keys $d_1$ and $d_2$. The selector 710 selects key values, $d_1^i$ of $d_1$ and $d_2^i$ of $d_2$, of the window $$(2 \times w) \left\lceil \frac{\log_2 \lceil k \rceil}{w} \right\rceil$$

times in an order from the upper part of the window to the lower part of the window in the LTR way. The table calculator 720 outputs exponentiation values $M^{d1i+d2i}$ corresponding to a sum ($d_1^i+d_2^i$) of the key values of the selected window (2×w) among the calculated table values. In an example embodiment, exponentiation values $M^{d1i}$ and $M^{d2i}$ are not separately output, rather every exponentiation value $M^{d1i+d2i}$ is output.

Then, the involution unit 730 involves the output exponentiation values $M^{d1i+d2i}$ and outputs the involved value Q as an encrypted message. The involution unit 730 performs square operations (e.g., $R^{2^w}$) of a previous involution value (at S860) as many times as the number w of given bits of each of the split secret keys $d_1$ and $d_2$ is an exponent during each involution operation, and performs a multiplication operation once by multiplying one exponentiation value (e.g., $M^{d1,d-1+d2,d-1}$, or $M^{d1,d-2+d2,d-2}$, ... ) output according to the selected window by the result of the square operations. In an example embodiment, since an exponentiation value output according to the selected window is multiplied only once, the example methodology as described in FIGS. 7 and 8 is performance-oriented.

In operation 870, when the selector 710 selects a window $$\left\lceil \frac{\log_2 \lceil d \rceil}{w} \right\rceil$$

times, the involution unit 730 involves the output exponentiation values $$\left\lceil \frac{\log_2 \lceil d \rceil}{w} \right\rceil$$

times in the same manner (while output of S870) is 'NO') and finishes the involution (once output of S870 is 'YES'). The resultant output message R is then output (at S880) to a post-processor in an upper layer for signature/verification. In an example, the involution unit 730 may also be referred to as a logic circuit configured to output the encrypted message (resultant output message R).

Figure 9:
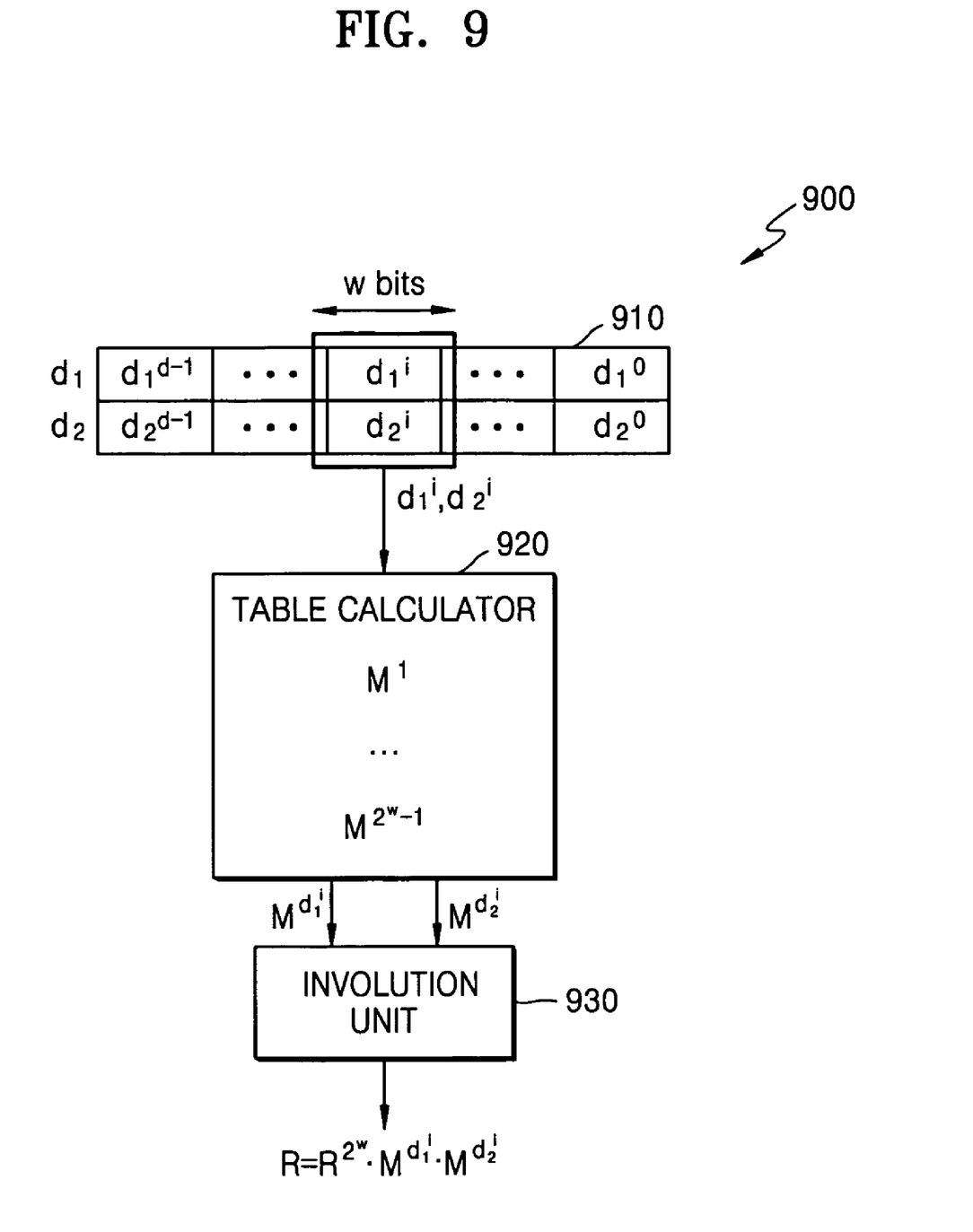
FIG. 9 is a block diagram of a memory-oriented cryptography system for a blinding-exponent DPA countermeasure in RSA-like cryptography according to another example embodiment of the present invention.

FIG. 9 is a block diagram of a memory-oriented system 900 for a blinding-exponent DPA countermeasure in RSA-like cryptography according to another example embodiment of the present invention. Referring to FIG. 9, system 900 may include a selector 910, a table calculator 920 and an involution unit 930. Operation of the cryptography system 900 may be described with reference to FIG. 10.

Figure 10:
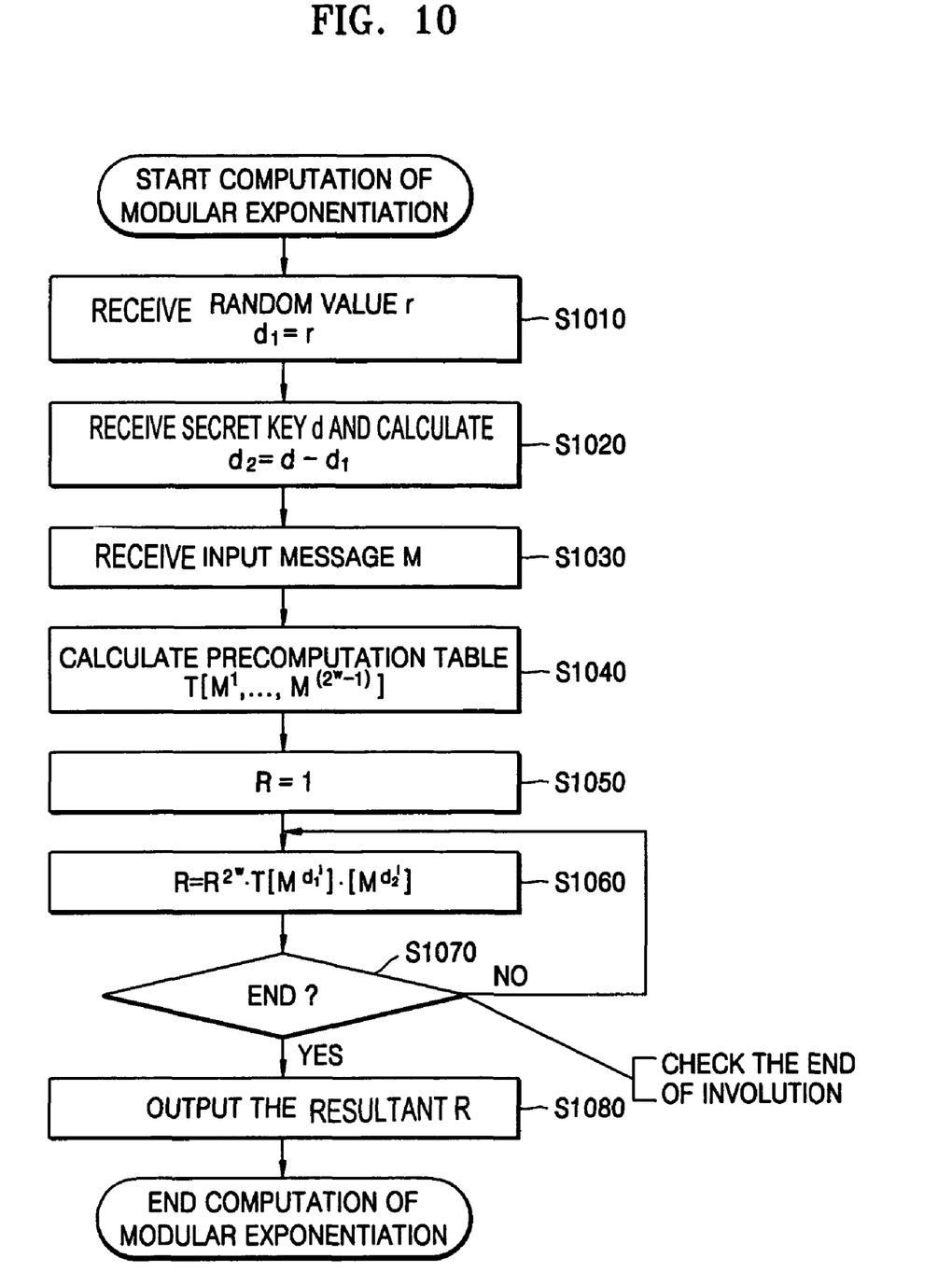
FIG. 10 is a flowchart illustrating an operation of the cryptography system of FIG. 9.

As in FIG. 8, a splitter (not shown) receives a random value $d_1$=r (S1010) and an input secret key d (S1020), calculates another secret key $d_2=d-d_1$ (S1030), and then outputs two split secret keys $d_1$ and $d_2$.

The table calculator 920 receives an input message M to be encrypted (S1030) and receives the number w of given bits of each of the split secret keys $d_1$ and $d_2$. The table calculator 920 calculates table values T[$M^1$, $M^2$, $M^3$, ...] made up of $2^w-1$ exponentiation values (S1040) by the modular exponentiation operation based on the input message M and the number of bits w. That is, the table calculator 920 calculates, as the table values, exponentiation values of the input message M where a number less than the number w of given bits of each of the split secret keys $d_1$ and $d_2$ is an exponent (e.g., $2^w-1$).

The involution unit 930 periodically resets (R=1) a previous involution value (S1050) before starting involution. Then, the selector 910 starts to sequentially select a window (2×w) made up of the given bits of each of the split secret keys $d_1$ and $d_2$. The selector 910 selects key values, $d_1^i$ of $d_1$ and $d_2^i$ of $d_2$, of the window $$(2 \times w) \left\lceil \frac{\log_2 \lceil d \rceil}{w} \right\rceil$$

times in an order from the upper part of the window to the lower part of the window in the LTR way. The table calculator 920 outputs exponentiation values $M^{d1i}$ and $M^{d2i}$ corresponding to each of the key values ($d_1^i$ and $d_2^i$) of the selected window (2×w) from the calculated table values. In an example embodiment, a single exponentiation value $M^{d1i+d2i}$ is not output, but two exponentiation values $M^{d1i}$ and $M^{d2i}$ are separately output. The configuration as described in FIGS. 9 and 10 is memory-oriented by storing the table values T[$M^1$, $M^2$, $M^3$, ... ] in the table calculator 920, rather than performance-oriented as described in FIGS. 7 and 8.

The involution unit 930 then involves the output exponentiation values $M^{d1i}$ and $M^{d2i}$ and outputs the involved value Q as an encrypted message. The involution unit 930 performs square operations (e.g., $R^{2^w}$) of a previous involution value (at S1060) as many times the number w of given bits of each of the split secret keys $d_1$ and $d_2$ is an exponent during each involution operation, and performs a multiplication operation once for each by multiplying two exponentiation values (ex, $M^{d1,d-1}$ and $M^{d2,d-1}$, or $M^{d1,d-2}$ and $M^{d2,d-2}$, ... ) output according to the selected window by the result of the square operations. In an example embodiment, as the size of the memory storing the table values T[$M^1$, $M^2$, $M^3$, ... ] in the table calculator 920 is reduced, performance can be degraded since the multiplication operation is performed an additional time as compared to FIG. 7. However, since the numbers of bits of the split secret keys $d_1$ and $d_2$ are the same and the same input message M is used to generate the table values T[$M^1$, $M^2$, $M^3$, ... ], substantial performance deterioration may be avoided, and/or memory costs may be reduced as compared to the conventional arrangement in FIG. 1.

At S1070, when the selector 910 selects a window $$\left\lceil \frac{\log_2 \lceil d \rceil}{w} \right\rceil$$

times, the involution unit 930 involves the output exponentiation values $$\left\lceil \frac{\log_2\lceil d \rceil}{w} \right\rceil$$

times in the same manner (while output of S1070) is 'NO') and finishes the involution (once output of S1070 is 'YES'). The resultant output message R is output (at S1080) to a post-processor in an upper layer for signature/verification. In an example, the involution unit 930 may also be referred to as a logic circuit configured to output the encrypted message (resultant output message R).

As described above, in a cryptography system according to example embodiments of the present invention, the table calculator 320/520 based on the EC operation outputs a single scalar multiplication value $(k_1^i+k_2^i)P$ related to a certain window of the sequentially input split secret keys $k_1$ and $k_2$ or scalar multiplication values $k_1^iP$ and $k_2^iP$ corresponding to each of input bits, and the accumulator 330/530 blinds a secret key exponent by accumulating the output values. In addition, the table calculator 720/920 based on the modular exponentiation operation outputs a single exponentiation value $M^{d1i+d2i}$ related to a certain window of the sequentially input split secret keys $d_1$ and $d_2$ or exponentiation values $M_{d1i}$ and $M^{d2i}$ corresponding to each of input bits, and the involution unit 730/930 blinds a secret key exponent by involving the output values.

Although described primarily in terms of hardware above, the example methodology implemented by one or more components of the example system described above may also be embodied in software as a computer program. For example, a program in accordance with example embodiments of the present invention may be a computer program product causing a computer to execute a method for encrypting input data by implementing the functionality as described in any of FIGS. 4, 6, 8 and/or 10, for example.

The computer program product may include a computer-readable medium having computer program logic or code portions embodied thereon for enabling a processor of a system in accordance with an example embodiment to perform one or more functions in accordance with the example methodology described above. The computer program logic may thus cause the processor to perform the example method, or one or more functions of the example method described herein.

The computer-readable storage medium may be a built-in medium installed inside a computer main body or removable medium arranged so that it can be separated from the computer main body. Examples of the built-in medium include, but are not limited to, rewriteable non-volatile memories, for example, RAM, ROM, flash memories and hard disks. Examples of a removable medium may include, but are not limited to, optical storage media, for example, CD-ROMs and DVDs; magneto-optical storage media, for example, MOs; magnetism storage media, for example, floppy disks (trademark), cassette tapes, and removable hard disks; media with a built-in rewriteable non-volatile memory, for example, memory cards; and media with a built-in ROM, for example, ROM cassettes.

These programs may also be provided in the form of an externally supplied propagated signal and/or a computer data signal embodied in a carrier wave (e.g., transmission through the internet). The computer data signal embodying one or more instructions or functions of the example methodology may be carried on a carrier wave for transmission and/or reception by an entity that executes the instructions or functions of the example methodology.

For example, the functions or instructions of the example methods as shown in any of FIGS. 4, 6, 8 and/or 10 may be implemented by processing one or more code segments of the carrier wave in a computer controlling one or more of the components of the example system in any of FIGS. 3, 5, 7 and/or 9, where instructions or functions may be executed for encrypting data, in accordance with the example method outlined in any of FIGS. 4, 6, 8 and/or 10. Further, such programs, when recorded on computer-readable storage media, may be readily stored and distributed. The storage medium, as it is read by a computer, may enable the encrypting of input data in accordance with the example methods described herein.

The cryptographic systems and method according to example embodiments of the present invention can be applied in any field or any representation of an ECC crypto-system or an RSA-like crypto-system. The example systems and method may be configured to encrypt input data at a high speed with blinding a secret key exponent in terms of performance-oriented or memory-oriented, and counter DPA attacks without degrading system performance and/or security resistance level.

Example embodiments of the present invention being thus described, it will be obvious that the same may be varied in many ways. For example, the functional blocks of FIGS. 3-10 describing the example system and/or method may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations or functions. The computer executable program(s) may also be provided as part of externally supplied propagated signal(s). Such variations are not to be regarded as departure from the spirit and scope of example embodiments of the present invention, and all such modifications as would be obvious to one skilled in the art are intended to be included within the scope of the following claims.

What is claimed is:

1. A cryptographic system, comprising:
   a processor configured to receive an input secret key and to generate at least two split secret keys whose sum is the input secret key;
   a selector configured to sequentially select a window including given bits of each of the split secret keys;
   a table calculator configured to calculate table values composed of scalar multiplication values by Elliptic Curve (EC) operation based on an input point and the number of given bits, and to output scalar multiplication values corresponding to the selected window from the calculated table values; and
   an accumulator configured to accumulate the output scalar multiplication values and to output the accumulated value as an encrypted point.

2. The system of claim 1, wherein the table calculator is configured to calculate, as the table values, scalar multiplication values based on the input point, where a number less than a number obtained by adding 1 to the number of given bits is an exponent.

3. The system of claim 2, wherein the accumulator is configured to perform a number of EC doubling operations of a previous accumulation value equal to the number of given bits, and to perform an EC addition operation once by adding a scalar multiplication value output according to the selected window to the result of the EC doubling operations during each accumulation operation.

4. The system of claim 1, wherein the table calculator is configured to calculate, as the table values, scalar multiplication values based on the input point, where a number less than the number of given bits is an exponent.

5. The system of claim 4, wherein the accumulator is configured to perform a number of EC doubling operations of a previous accumulation value equal to the number of given bits, and to perform a number of EC addition operations equal to the number of calculated scalar multiplication values by adding scalar multiplication values output according to the selected window to the result of the EC doubling operations during each accumulation operation.

6. The system of claim 1, wherein the split secret keys have the same number of bits.

7. A method of encrypting input data, comprising:
receiving an input secret key;
generating, by a processor, at least two split secret keys whose sum is the input secret key;
sequentially selecting a window made up of given bits of each of the split secret keys;
calculating table values composed of scalar multiplication values by Elliptic Curve (EC) operation based on an input point and the number of given bits;
outputting scalar multiplication values corresponding to the selected window from among the calculated table values;
sequentially accumulating the output scalar multiplication values; and
outputting the accumulated value as an encrypted point.

8. The method of claim 7, wherein the table values are made up of scalar multiplication values based on the input point, where a number less than a number obtained by adding 1 to the number of given bits is an exponent.

9. The method of claim 8, wherein a number of EC doubling operations of a previous accumulation value are performed so as to equal the number of given bits, and an EC addition operation is performed once by adding a scalar multiplication value output according to the selected window to the result of the EC doubling operations during each accumulation operation.

10. The method of claim 7, wherein the table values are composed of scalar multiplication values based on the input point, where a number less than the number of given bits is an exponent.

11. The method of claim 10, wherein a number of EC doubling operations of a previous accumulation value are performed so as to equal the number of given bits, and a number of EC addition operations are performed so as to equal the number of scalar multiplication values by adding scalar multiplication values output according to the selected window to the result of the EC doubling operations during each accumulation operation.

12. The method of claim 7, wherein the split secret keys have the same number of bits.

13. A computer program product comprising a non-transitory computer-readable medium storing computer readable code for instructing a cryptographic system to encrypt input data, the computer program logic causing the processor to perform the functions of:
receiving an input secret key;
generating at least two split secret keys whose sum is the input secret key;
sequentially selecting a window made up of given bits of each of the split secret keys;
calculating table values composed of scalar multiplication values by Elliptic Curve (EC) operation based on an input point and the number of given bits;
outputting scalar multiplication values corresponding to the selected window from among the calculated table values;
sequentially accumulating the output scalar multiplication values; and
outputting the accumulated value as an encrypted point.

* * * * *